(Model.)
J. R. HOOD.
HOE, RAKE, &c.
No. 265,605.　　　　　Patented Oct. 10, 1882.
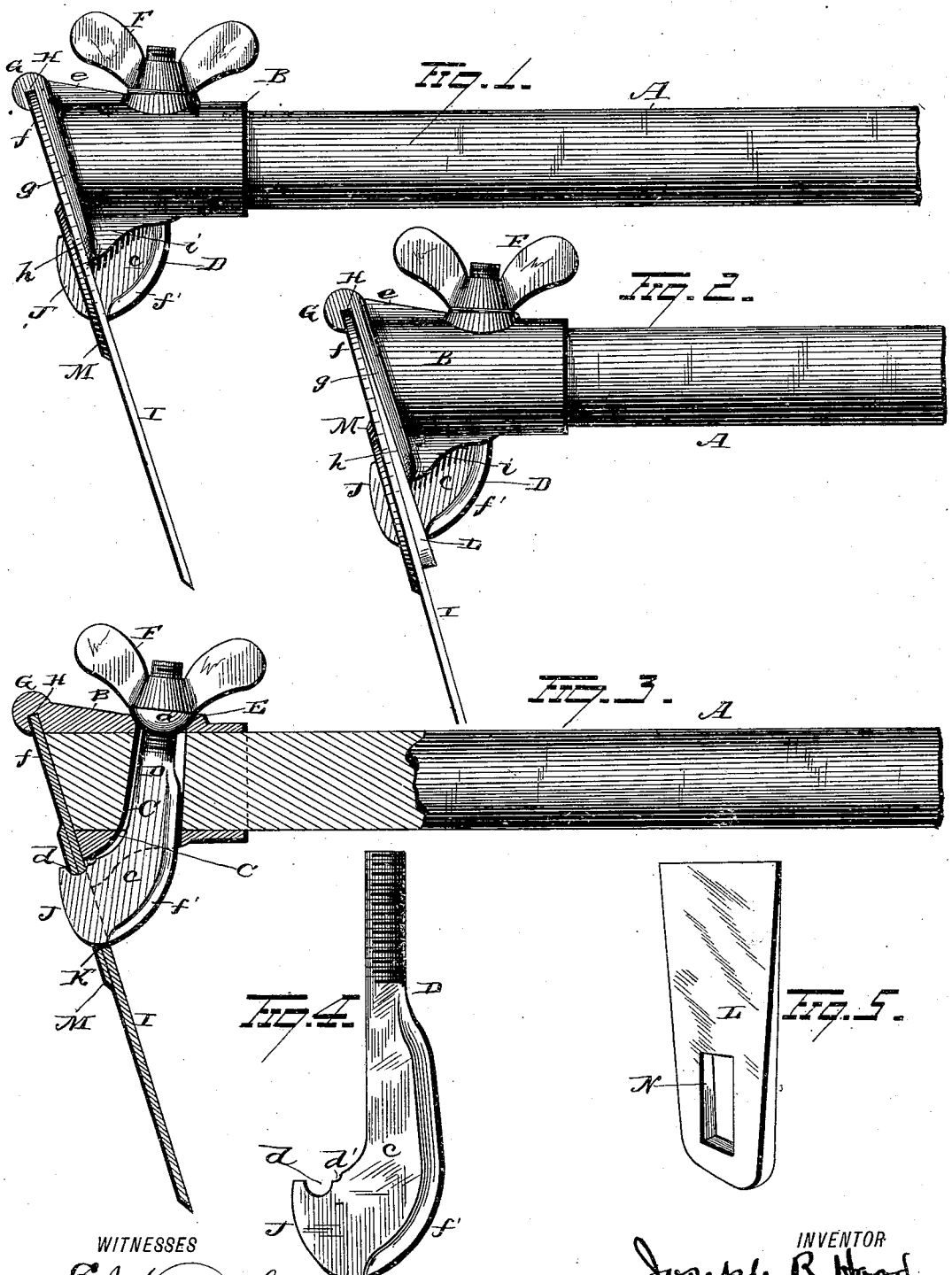
WITNESSES
INVENTOR
Joseph R Hood.
By H. A. Symmons
Attorney

UNITED STATES PATENT OFFICE.

JOSEPH R. HOOD, OF PHILADELPHIA, PENNSYLVANIA.

HOE, RAKE, &c.

SPECIFICATION forming part of Letters Patent No. 265,605, dated October 10, 1882.

Application filed January 11, 1882. (Model.)

*To all whom it may concern:*

Be it known that I, JOSEPH R. HOOD, of Philadelphia, in the county of Philadelphia and State of Pennsylvania, have invented certain new and useful Improvements in Hoes, Rakes, &c.; and I do hereby declare the following to be a full, clear, and exact description of the invention, such as will enable others skilled in the art to which it pertains to make and use the same.

My invention relates to an improvement in hoes, rakes, and other agricultural implements.

Heretofore hoe-blades have been adjustably secured to the hoe-handle by means of a round hook-bolt, the curved outer end of which passes through a round opening in the hoe-blade, while the upper end passes through an opening in the eye or socket of the handle and is secured by means of a flat thumb-nut, which rests on a flat boss formed on the eye or socket of the handle. This form of construction is objectionable, for the reason that the faces of the flat nut and flat boss will not correspond if the inclination or angle of the hoe-blade is changed, as the bolt by its different inclinations assumes a more or less transverse relation to the handle, and thus causes the nut to bear or rest on one edge, and when sufficiently strained to secure the hoe-blade in position will bend or break the bolt. Another objection to the use of this style of hoes now used is that the opening through the eye of the handle for the passage of the hook-bolt is just of size sufficient to allow the said bolt to pass through without allowing it any movement backward or forward, and consequently rendering the adjustable inclination of the hoe-blade impossible. Another objection to the above form of construction is that where no provision is made for the back-and-forth movement of the hook-bolt only those hoe-blades having the opening into which the curved end of the hook-bolt rests the same predetermined distance from the upper edge of the blade can be secured to the handle. An objection to the use of the round bolt heretofore referred to is that in every attempt to fasten the hoe-blade to the handle the bolt turns with the nut, and when the implement is in use the bolt is caused by the jarring to assume its original and proper position, and consequently leave the hoe-blade loosely secured in the handle.

The object of my invention is to obviate the defects above noted by providing means for securely fastening the blades to the handle in any desired inclination or angular adjustment.

With these ends in view my invention consists in certain details in construction and combinations of parts, as will be more fully described, and pointed out in the claims.

In the accompanying drawings, Figure 1 is a view in side elevation of a hoe constructed according to my invention. Fig. 2 is a similar view, showing the manner of securing a wedge in position. Fig. 3 is a longitudinal sectional view. Fig. 4 is a detached view of the hook-bolt, and Fig. 5 is a detached view of the wedge.

A represents a handle, to the outer end of which is secured the eye or socket B. This eye B, which receives the end of the helve or handle A, consists of a tubular or socketed plate, provided centrally with the oblong opening C for the passage of the hook-bolt D, and adapted to allow it to be moved forward and backward, according to the desired adjustment of the blade, and on its top or upper surface with the concave boss, on which the convex face $a$ of the thumb-nut F rests. The handle A passes entirely through the eye or socket B, and is also provided with an oblong or rectangular slot passing transversely through the same and adapted to register with the openings in the eye B for the passage of the hook-bolt D. The front or outer end of the eye or socket B and the handle A are so inclined that when the hoe-blade rests firmly against the same without the interposition of any wedge it stands at its most acute angle, and by interposing wedges of different thicknesses this angle can be increased until the blade stands at a right angle from the handle. The upper edge of this eye or socket B is widened or laterally extended and provided with a depending flange, G, arranged transversely to the length of the handle. By providing this depending flange G a groove, H, is formed, into which is received the upper straight edge $f$ of the hoe-blade I. This eye or socket B is also provided with the side flanges, $g$, and on its lower edge or side with the depending lip or flange h, which is merely a continuation of the side flanges, g and g. The opening in the lower face of the eye or socket B passes centrally through this depending lip or flange h, so as to allow the hook-bolt to fit snugly therein, and also to allow the point of bearing of the blade I on the said hook-bolt to be above the lower edge of the lip or flange h, so that when the blade is secured in place by tightening the thumb-nut the said lower edge of the depending lip or flange will not form a fulcrum against which the blade bears, and consequently will not strain the blade or cause it to bend while it is being secured in position. The depending flange h extends down considerably below the eye or socket, and is strengthened by the ribs i, which latter are situated respectively on opposite sides of the rectangular slot C, and form a continuation of the walls or lining of the said slot, which thoroughly houses and protects the hooked portion or end of the bolt D, and prevents foreign matter from becoming clogged between the parts. The construction of the flanges above described furnishes increased bearing-surfaces for the blade, and also for the wedge when it is necessary to use the same. The depending lower flange also prevents the hook-bolt from turning while the blade is being secured in position.

D is the hook-bolt, having its upper end or shank portion screw-threaded for the attachment of the thumb-nut F, the latter having, as before stated, a convex under surface, a, that fits the concave boss E on the eye or socket B, thereby allowing the lower end of the hook-bolt to be moved forward or backward, according to the desired adjustment of the blade, and under all such varied adjustments insure a firm and equal bearing of the nut on the boss without unduly straining any parts. The body portion c of this bolt is also formed rectangular in shape, which prevents it from turning in the slot C, and is provided at its lower end with the curved hooked end J, adapted to project forward and enter the slot K in the blade I, the upper face of the said curved end being provided with rounded notch d, for the reception of the bearing portion of the blade, and a second notch, d', back of the first one, in which rests or bears the slotted end of the wedge L. The peculiar curvature and construction of the lower end of this hook-bolt D allows it, when a short-headed blade is used, to lie up closely to the blade and to the eye or socket B, and thereby close the space where clogging matter would be likely to fasten itself when the hoe or implement is being used in wet earth or mortar. This construction of parts also allows different sized plates, blades, rake, &c., to be secured thereto with equal facility and firmness. The upper surface of the eye or socket B is provided with the longitudinal rib e, adapted to increase its strength, while the lower end of the hook-bolt D is provided with the web or rib f, adapted to increase the thickness of the bolt at the point where an increased amount of metal is most needed. The curved end of the hook-bolt D is adapted to enter the oblong slot K of the blade I and practically fill the same and prevent it from being filled up with foreign matter.

M is a circular re-enforcing disk, secured to one side of the blade by rivets passing through the disk and blade. The oblong slot K, before referred to, is formed in the center of this disk, and the strength of the hoe is increased at this point, which prevents the edge of the hoe forming the top of the rectangular slot from being distorted in shape after constant and severe usage. Besides performing the function of re-enforcing the blade I, this disk M gives a second incline or adjustment to the blade when the latter is reversed, so that the disk comes between the blade and the hook-bolt without the interposition of a wedge. When the blade is in the position shown in the drawings the re-enforcing disk M is located on the outer side of the blade and a wedge is inserted between the blade and holding-shank to move the lower portion of the blade outward. By reversing the blade the wedge is inserted between the re-enforcing disk M and the holding-shank, thus enabling the blade to be moved forward a greater distance and more nearly to a vertical position.

When it is desired to increase the angle of the hoe-blade a wedge, L, of any suitable thickness and similar to those shown in the drawings, is placed on the hook-bolt between the end of the eye or shank and the blade and the parts are tightened in the ordinary manner. These wedges L are all provided at their lower ends with oblong slots N, into which the curved end of the hook-bolt D passes, and which holds it against displacement.

Having described the different parts of my improvement, I will now briefly describe its mode of operation.

To secure the blade to the handle at its most acute angle, the thumb-nut F is loosened until the curved end of the hook-bolt can pass into the oblong slot K. The straight edge b of the hoe-blade I is then placed in the groove and the nut F tightened, which holds the blade firmly against displacement. When it is desired to increase the angle or inclination of the blade a wedge, L, is first placed on the hook-bolt D and moved backward until it rests in the rear notch, d', and then the blade is put on, as before described, and secured in the same manner. The blade, when thus secured, is not only braced against longitudinal displacement, but also against any lateral or transverse displacement, as the hook-bolt fits snugly within the oblong opening in the blade, and thus serves to prevent the blade from twisting out of place.

It is evident that slight changes in the construction of the different parts of my improvement might be resorted to without departing from the spirit of my invention; and hence I would have it understood that I do not limit myself to the exact construction of parts shown and described, but consider myself at liberty to make such changes as come within the spirit and scope of my invention.

Having fully described my invention, what I claim as new, and desire to secure by Letters Patent, is—

1 The combination, with a socket having an elongated opening formed therein, and a flange on the end of the socket for receiving the upper edge of a blade, of a hook-bolt provided with a rectangular or flattened body or shank that extends into the elongated slot in the socket and fits against the sides thereof and prevents the bolt from turning and allows the lower end thereof to be moved backward and forward, substantially as set forth.

2. The combination, with a socket having an elongated opening formed therein, and a flange on the end of the socket for receiving the upper edge of a blade, of a hook-bolt provided with a screw-threaded end, and a flattened or rectangular shank that fits against the sides of the rectangular slot in the socket, and a nut for retaining the hook-bolt in place, substantially as set forth.

3. The combination, with a socket having an elongated opening formed therein, a flange for receiving the upper edge of a blade, and a concave bearing for the fastening-nut, of a hook-bolt provided with a screw-threaded end, and a flattened or rectangular shank that fits against the sides of the rectangular slot in the socket, and a nut constructed with a convex face that fits in said concave bearing in the socket, substantially as set forth.

4. The combination, with a socket provided with an enlarged flange on its outer end for receiving the upper edge of the blade, and a hook-bolt adapted to be inserted through the socket and secure the blade at different angles of inclination, of a wedge provided with a slot for receiving the lower portion of the hook-bolt and adapted to be inserted between the socket and blade, substantially as set forth.

5. The combination, with the eye or socket B, provided with the flange G, boss E, and rectangular opening C, and the blade I, of the hook-bolt D, constructed substantially as described, and the nut F, provided with the convex face $a$, substantially as set forth.

6. The combination, with the socket B, blade I, and wedge L, of the bolt D and nut F, substantially as set forth.

7. The combination, with the socket B, constructed as described, blade I, and wedge, of the bolt D, constructed as described, the lower end of which is adapted to pass through said wedge and blade, and the nut F for securing the parts in position, substantially as set forth.

8. The combination, with the socket B, having an elongated opening formed therein, and the hook D, constructed with a flattened or rectangular body portion adapted to fit against the sides of the elongated slot in the socket, of a blade provided with the single re-enforcing and adjusting disk M, substantially as set forth.

9. The combination, with the eye or socket B, provided with the flange G, lateral flanges $g$, and depending lip or flange $h$, of the blade I and hook-bolt D, substantially as set forth.

10. The combination, with the eye or socket B, provided with the flange G, lateral flanges $g$, and depending lip or flange $h$, provided with a slot or recess for the reception of the hook-bolt, of the blade I and hook-bolt D, substantially as set forth.

In testimony whereof I have signed this specification in the presence of two subscribing witnesses.

JOSEPH R. HOOD.

Witnesses:
CHAS. M. LUKENS,
WILLIAM F. LARER.